Sept. 25, 1956     O. L. ADAMS ET AL     2,764,215
WHEEL STRAIGHTENING ATTACHMENT
Filed Dec. 31, 1954
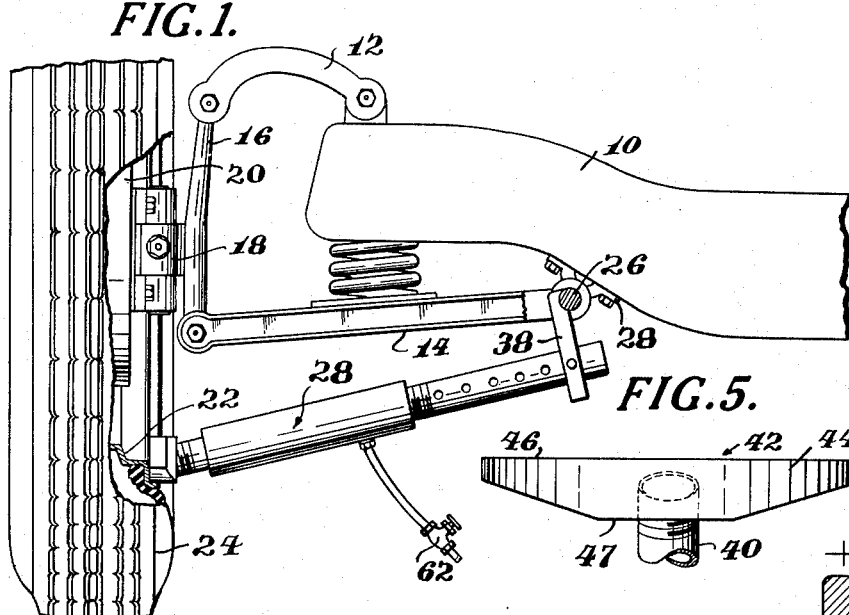
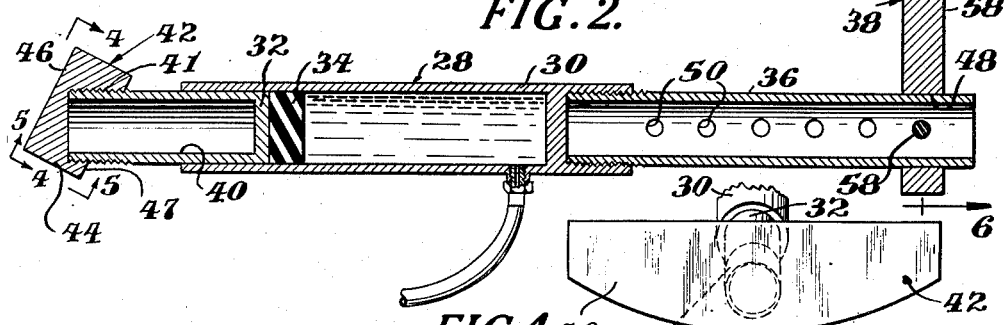
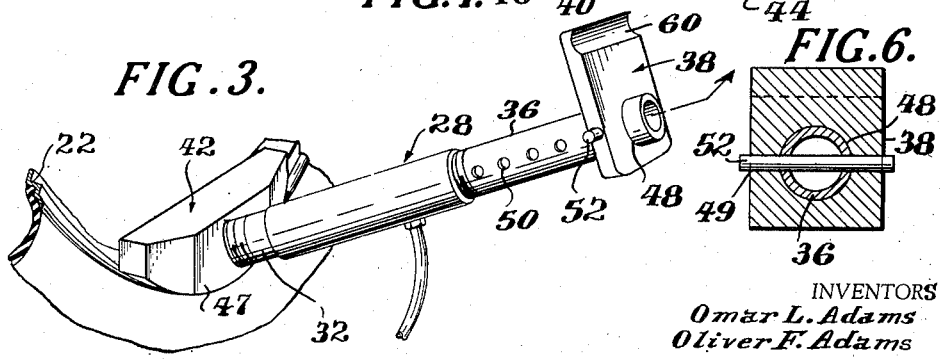
INVENTORS
Omar L. Adams
Oliver F. Adams
BY *Cushman, Darby & Cushman*
ATTORNEYS

United States Patent Office 2,764,215
Patented Sept. 25, 1956

2,764,215

WHEEL STRAIGHTENING ATTACHMENT

Omar L. Adams and Oliver F. Adams, Alamosa, Colo.

Application December 31, 1954, Serial No. 479,120

5 Claims. (Cl. 153—48)

The invention relates to apparatus for straightening or realigning the wheels of a motor vehicle without removing the wheel therefrom.

More particularly, this invention relates to apparatus which is particularly adapted to straighten or align the front wheel of an automobile, without removing the wheel from the automobile, by providing a jack having footings formed to engage standard fittings that are found in the same general position on all types of automobiles which are presently being widely used in this and other countries.

When automobiles are driven over high curves, rough roads, pot holes, or the like, at inordinate speeds, it frequently occurs that one or more wheels, and particularly one of the front wheels, is injured by having one sector of the wheel rim bent out of alignment with the original plane of the wheel as a whole. It is well known that such bending or distortion of the wheel line results in an improper alignment of at least a portion of the tire with the rim, and that such a condition leads to both irregular tire wear and an uncomfortable ride for the passengers of the automobile. As this type of injury is rather common, various types of machines and apparatus have been previously developed to effect straightening or realigning of the bent rim. However, some of the best equipment developed heretofore has been so designed that it is necessary to remove the injured wheel from the vehicle and to place it upon special frames or other supporting means before straightening it. It will be readily seen that such special equipment is expensive, adds materially to the cost of equipping a modern garage and takes up valuable floor space which is frequently at a premium in such an establishment. It will also be readily understood that as this equipment requires the dismounting of the entire wheel, the labor charge incurred in the straightening of a wheel is necessarily larger than the charge which would be made if the wheel could be straightened while remaining mounted in its normal location on the automobile.

It is therefore an object of this invention to provide means for straightening an automobile wheel rim while the wheel remains fixed in its normal position on the automobile.

It is a further object of this invention to provide a means for straightening a wheel which may be produced at a much lower cost than the equipment presently available.

It is a still further object of this invention to provide apparatus for straightening bent wheels which may be operated at a low cost by relatively unskilled labor.

It is still another object of this invention to provide apparatus for wheel rims which can be economically produced from easily obtainable or easily fabricated elements.

It is a further object of this invention to provide an apparatus for straightening wheel frames which is compact and which may be easily stored when not in use.

These and other objects of this invention will be fully understood from the following detailed description of a typical preferred form and application of the invention, throughout which descriptive reference is made to the accompanying drawings in which:

Figure 1 is a front elevational view of the front portion of the frame of an automobile having the wheel aligning device operatively installed thereon, with portions of the automobile wheel broken away to more clearly illustrate details of the invention;

Figure 2 is an elevational view, taken in section, of the wheel aligning device;

Figure 3 is a perspective view of the wheel alignment device, with a wheel shown fragmentarily, to illustrate the operative position of the device;

Figure 4 is an elevational view taken along line 4—4 of Figure 2;

Figure 5 is a plane view taken along line 5—5 of Figure 2; and

Figure 6 is a section taken along line 6—6 of Figure 2.

In the automobile illustrated in Figure 1, the front transverse girder frame 10 forms support for the "front end" assembly which comprises an upper control arm 12 pivotally mounted on the upper portion of the frame and the lower control arm 14 pivotally mounted on the lower portion of the frame. The free ends of the arms 12 and 14 are pivotally connected to a vertically extending steering knuckle support 16, which is, in turn, pivotally fixed at 18 to the wheel thereon, generally indicated at 20. The wheel rim 22, carrying tire 24, is mounted on the wheel drum by means of bolts, not illustrated. The lower control arm 14 is to be found on all standard brands of automobiles and is usually formed in plan view (not shown) as a V-shaped member having its apex connected with the steering knuckle support 18 and having the free ends of its arms pivotally connected to a longitudinally extending cylinder pivot shaft 26, which is securely fixed to the frame 10 by bracket 28 or by some other suitable fixture.

In the preferred embodiment illustrated in Figure 2, a hydraulic jack, generally indicated at 28, consists of a cylinder 30 and a movable piston 32 slidably disposed therewithin. The face of the piston member is provided with a facing pad 34 formed of a resilient material which has a relaxed diameter slightly greater than the bore of the cylinder 30. The pad 34 forms a seal between the piston and the cylinder, although the piston member may be provided with piston rings or some other sealing means if preferred. The closed end of the cylinder 30 has a cylinder extension 36 threadedly engaged therewith and this extension carries a heel 38 selectively positioned and fixed thereon. The end 40 of the piston 32 which extends without the cylinder 30 has its exterior surface threaded and extends within a suitable threaded aperture 41 in shoe 42.

Referring more particularly to Figures 4 and 5, it will be seen that the shoe 42 consists of a polygonal block having one side 44 uniformly curved to fit a segment of the rim of an automobile wheel. A second side 46 of the polygonal block is flat, and is normal to the curved surface 44. A third side 47, opposite and substantially parallel to the second side 46, has aperture 41 bored therein at an angle of approximately 45° thereto. As stated above, this aperture is tapped for threaded engagement with the threaded end 40 of the piston 32 although it is entirely within the contemplation of this invention that the two members might be engaged in any other suitable manner.

As shown in Figures 1, 2 and 6, the heel 38 comprises a substantially rectangular plate having an aperture 48 formed therein so that the shoe may receive and be moved along the cylinder extension 36. The plate has a transversely extending aperture 49 which may be aligned with oppositely disposed apertures 50 in the cylinder extension 36. The heel 38 may be secured in any of the positions defined by apertures 50 by the insertion of pin 52 through the apertures 49 and 50. The face 58 of the heel furthest from the cylinder has a transversely extending groove 60 formed therein. The groove 60 is located above the aperture 48 and has a radius of curvature similar to, or larger than, the radius of the pivot shaft 26.

As illustrated in Figures 1, 2, 3 and 6, the wheel aligning device is operated by placing the flat surface 46 of the shoe 42 transversely against the rim 22 with the curved surface 44 fitting radially into, and matching the configuration of, the normal curvatures of the rim. Any fluid pressure within the hydraulic chamber 28 is released and the piston is allowed to move into the chamber until it is in its fully retracted position. The heel 38 is then selectively positioned on the cylinder extension 36 with its groove 60 a short distance away from the pivot shaft 26. The hydraulic jack 28 is then energized by opening the valve 62, connected with a source of fluid pressure (not shown), and the piston is immediately extended by the mounting hydraulic pressure.

It will be readily seen that the shoe 42 must have a substantial length, that is to say, it must bear against a substantial segment of the wheel so that there will be no tendency on the part of the wheel to turn under the urging of the force exerted by the hydraulic jack 28. As the shoe exactly fits the configuration of the wheel, and as the flat surface 46 applies a force normal to the plane defined by the wheel, the operation of the jack 28 serves to straighten and realign any dents or unwanted curvatures in the rim 22 of the wheel. If the wheel is dented or warped in more than one peripheral location, the jack may be relaxed, the wheel rotated, and then the process may be repeated.

While in the illustrated preferred embodiment a hydraulic jack is utilized as a longitudinally extending means, it is entirely within the contemplation of this invention that other longitudinally extending means may also be used, for example, a screw threaded jack.

As we have described only a typical preferred form and application of our invention, we do not wish to be limited or restricted to specific details herein set forth but wish to reserve to ourselves any variations or modifications that may appear to those skilled in the art and falling within the scope of the following claims.

We claim:

1. Apparatus for straightening an automobile wheel mounted in operative position on an automobile having a longitudinally extending pivot shaft fixed thereto comprising: a wheel-bearing block having one side curved to fit a segment of the inner periphery of the rim of he wheel; a pivot shaft bearing member having one side thereof formed to fit the fixed pivot shaft; selectively operatable longitudinal expanding means fixed to and between said block and said bearing member, whereby a bent segment of said wheel may be urged to its correct and straight position while mounted on the automobile.

2. The apparatus defined in claim 1 in which said longitudinally expanding means is a hydraulic jack.

3. Apparatus for straightening an automobile wheel while mounted in operative position on an automobile having a longitudinally extending pivot shaft comprising: a polygonal shoe having one face curved to fit a properly shaped segment of the inner periphery of the rim of the wheel; said shoe having a second face, adjacent said first face, having a flat surface normal to said first face; a selectively operable longitudinal expanding means; a third face on said shoe having means for engaging said longitudinally expanding means; a heel member selectively positioned on and fixably attached to said longitudinally expanding means; said heel member having one face formed to fit and bear against a portion of the suf-face of the cylindrical pivot shaft whereby the bent segment of said wheel may be urged to its correct and straight position while mounted on the automobile.

4. The structure defined in claim 3 in which the curved face of said shoe has a substantial length to prevent said wheel from turning when said longitudinl expanding means are operated.

5. The structure defined in claim 4 in which said longitudinal expanding means is a hydraulic jack.

References Cited in the file of this patent
UNITED STATES PATENTS

| | | |
|---|---|---|
| 1,815,180 | Bennett | July 21, 1931 |
| 1,971,975 | Clark | Aug. 28, 1934 |
| 2,189,394 | Fried | Feb. 6, 1940 |
| 2,244,927 | Vanstone | June 10, 1941 |
| 2,256,231 | Bender | Sept. 16, 1941 |

FOREIGN PATENTS

| | | |
|---|---|---|
| 22,625 | France | Mar. 26, 1859 |

OTHER REFERENCES

Page 40 of the No. 239 P Service Manual of the Blackhawk Mfg. Co. of Milwaukee, Wisconsin, which was received in Div. 14 on March 5, 1940, and a copy of which may be found in 153–32C.